(12) United States Patent
Agranov et al.

(10) Patent No.: US 9,554,115 B2
(45) Date of Patent: Jan. 24, 2017

(54) IMAGING PIXELS WITH DEPTH SENSING CAPABILITIES

(71) Applicant: Semiconductor Components Industries, LLC, Phoenix, AZ (US)

(72) Inventors: Gennadiy Agranov, San Jose, CA (US); Dongqing Cao, San Jose, CA (US); Hirofumi Komori, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 245 days.

(21) Appl. No.: 13/728,086

(22) Filed: Dec. 27, 2012

(65) Prior Publication Data

US 2013/0222552 A1    Aug. 29, 2013

Related U.S. Application Data

(60) Provisional application No. 61/603,855, filed on Feb. 27, 2012.

(51) Int. Cl.
*H04N 13/02* (2006.01)

(52) U.S. Cl.
CPC ...... *H04N 13/0203* (2013.01); *H04N 13/0217* (2013.01)

(58) Field of Classification Search
CPC ................ H01L 27/14603; H01L 27/14627; H04N 9/045; H04N 13/0203; H04N 13/0217; G01R 33/0029; G01R 33/0035
USPC ............................................. 348/49; 375/240
See application file for complete search history.

(56) References Cited

U.S. PATENT DOCUMENTS

| | | | |
|---|---|---|---|
| 6,166,768 A * | 12/2000 | Fossum | G11C 19/282 257/E27.134 |
| 6,396,873 B1 * | 5/2002 | Goldstein | G02B 21/22 250/201.7 |
| 6,856,407 B2 | 2/2005 | Knighton | |
| 7,290,880 B1 | 11/2007 | Yaron | |
| 8,730,545 B2 | 5/2014 | Endo et al. | |
| 8,947,572 B2 * | 2/2015 | Venezia | 348/308 |

(Continued)

OTHER PUBLICATIONS

Adelson and Wang, "Single Lens Stereo with a Plenoptic Camera", IEEE PAMI, vol. 14, No. 2, (Feb. 1992).

(Continued)

*Primary Examiner* — Christopher S Kelley
*Assistant Examiner* — Deirdre Beasley
(74) *Attorney, Agent, or Firm* — Treyz Law Group, P.C.; Joseph F. Guihan

(57) ABSTRACT

An imager may include depth sensing pixels that receive and convert incident light into image signals. The imager may have an associated imaging lens that focuses the incident light onto the imager. Each of the depth sensing pixels may include a microlens that focuses incident light received from the imaging lens through a color filter onto first and second photosensitive regions of a substrate. The first and second photosensitive regions may provide different and asymmetrical angular responses to incident light. Depth information for each depth sensing pixel may be determined based on the difference between output signals of the first and second photosensitive regions of that depth sensing pixel. Color information for each depth sensing pixel may be determined from a summation of output signals of the first and second photosensitive regions.

21 Claims, 11 Drawing Sheets

(56) References Cited

U.S. PATENT DOCUMENTS

| | | |
|---|---|---|
| 9,106,826 B2 | 8/2015 | Aoki |
| 2003/0211405 A1* | 11/2003 | Venkataraman .. H01L 27/14621 430/7 |
| 2004/0012698 A1* | 1/2004 | Suda ................. H01L 27/14618 348/315 |
| 2005/0057655 A1* | 3/2005 | Duesma ............ H01L 21/76805 348/187 |
| 2007/0090423 A1* | 4/2007 | Park ................. H01L 27/14603 257/292 |
| 2008/0018662 A1 | 1/2008 | Gazeley |
| 2008/0180558 A1* | 7/2008 | Watanabe ............ H04N 5/3535 348/300 |
| 2008/0217718 A1* | 9/2008 | Mauritzson ....... H01L 27/14683 257/444 |
| 2008/0259202 A1 | 10/2008 | Fujii |
| 2008/0274581 A1 | 11/2008 | Park |
| 2009/0200589 A1* | 8/2009 | Qian ................. H01L 27/14603 257/292 |
| 2009/0230394 A1 | 9/2009 | Nagaraja et al. |
| 2010/0020209 A1 | 1/2010 | Kim |
| 2010/0060717 A1 | 3/2010 | Gunnewiek |
| 2010/0123771 A1 | 5/2010 | Moon |
| 2010/0245656 A1* | 9/2010 | Fujii ................. H04N 5/23212 348/345 |
| 2010/0290674 A1 | 11/2010 | Kim |
| 2011/0025904 A1 | 2/2011 | Onuki et al. |
| 2012/0019695 A1 | 1/2012 | Qian et al. |
| 2012/0043634 A1 | 2/2012 | Kurihara |
| 2012/0193515 A1 | 8/2012 | Agranov et al. |
| 2012/0212581 A1* | 8/2012 | Nagata ............... H04N 13/0217 348/46 |
| 2012/0212654 A1* | 8/2012 | Nagata ............... H04N 5/23212 348/247 |
| 2013/0038691 A1 | 2/2013 | Agranov et al. |
| 2013/0181309 A1 | 7/2013 | Johnson et al. |
| 2013/0182158 A1 | 7/2013 | Kobayashi et al. |
| 2013/0222552 A1 | 8/2013 | Agranov et al. |
| 2013/0222662 A1 | 8/2013 | Sakurai et al. |
| 2013/0256510 A1* | 10/2013 | Lyu ................... H01L 27/14612 250/208.1 |
| 2013/0271646 A1 | 10/2013 | Hamano |
| 2014/0103410 A1* | 4/2014 | Chen ................. H01L 27/14616 257/292 |
| 2014/0192248 A1 | 7/2014 | Kishi |
| 2014/0218580 A1* | 8/2014 | Mayer ............... H01L 27/14603 348/308 |
| 2015/0001589 A1 | 1/2015 | Tazoe et al. |
| 2015/0062422 A1 | 3/2015 | Stern |
| 2015/0312461 A1 | 10/2015 | Kim et al. |

OTHER PUBLICATIONS

"An Objective Look at FSI and BSI", An Aptina Technology White Paper, 2010 (6 pages) [Retrieved on Jun. 18, 2012], Retrieved from the Internet <URL: http://www.aptina.com/news/FSI-BSI-WhitePaper.pdf>.

Agranov et al., U.S. Appl. 13/404,319, filed Feb. 24, 2012.

* cited by examiner

IMAGING PIXELS WITH DEPTH SENSING CAPABILITIES

This application claims the benefit of provisional patent application No. 61/603,855, filed Feb. 27, 2012 which is hereby incorporated by reference herein in its entirety.

BACKGROUND

This relates generally to imaging systems, and more particularly to imaging systems with depth sensing capabilities.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some applications such as three-dimensional (3D) imaging may require electronic devices to provide stereo and/or depth sensing capabilities. For example, to properly generate a 3D image for a given scene, an electronic device may need to identify the distances between the electronic device and objects in the scene. To identify distances, conventional electronic devices use complex arrangements. Some arrangements require the use of multiple image sensors and camera lenses that capture images from various viewpoints. Other arrangements require the addition of lenticular arrays that focus incident light on sub-regions of a two-dimensional pixel array. Due to the addition of components such as additional image sensors or complex lens arrays, these arrangements lead to reduced spatial resolution, increased cost, and increased complexity.

DETAILED DESCRIPTION

Figure 1:
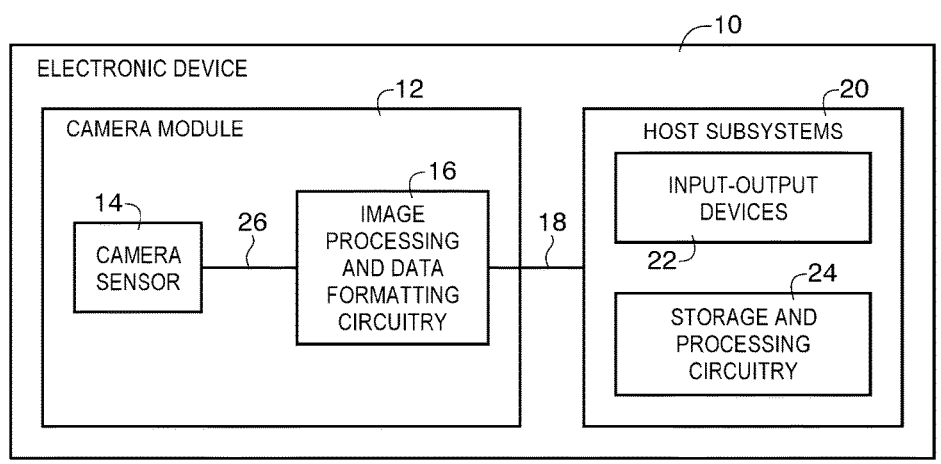
FIG. 1 is an illustrative schematic diagram of an electronic device with a camera sensor that may include depth sensing pixels in accordance with an embodiment of the present invention.

Embodiments of the present invention relate to image sensors with depth sensing capabilities. An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (e.g., pixels) that convert the light into digital data. Image sensors, may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files, if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

It may be desirable to provide image sensors with depth sensing capabilities (e.g., to use in 3D imaging applications such as machine vision applications and other three dimensional imaging applications). To provide depth sensing capabilities, camera sensor 14 may include pixels such as pixel 100 shown in FIG. 2A.

Figure 2A:
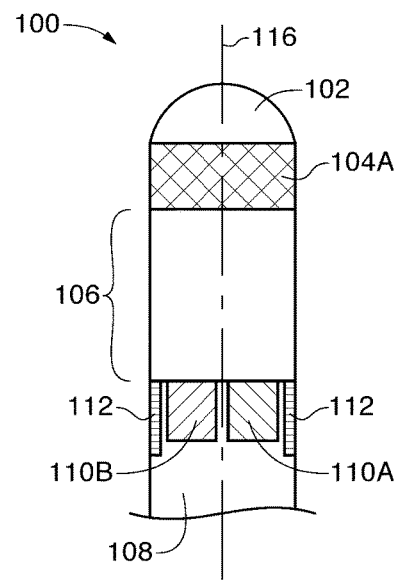
FIG. 2A is an illustrative cross-sectional view of a depth sensing pixel having photosensitive regions with different and asymmetric angular responses in accordance with an embodiment of the present invention.

FIG. 2A is an illustrative cross-sectional view of pixel 100. Pixel 100 may include microlens 102, color filter 104, stack of dielectric layers 106, and substrate layer 108. Photosensitive regions (areas) such as photosensitive regions 110A and 110B may be formed in substrate layer 108. In the example of FIG. 2A, photosensitive regions 110A and 110B are formed at a distance from each other. If desired, photosensitive regions 110A and 110B may be formed adjacent to each other (e.g., directly in contact). Pixel separating regions 112 may also be formed in substrate layer 108.

Microlens 102 may direct incident light towards a substrate area between pixel separators 112. Color filter 104 may filter the incident light by only allowing predetermined wavelengths to pass through color filter 104 (e.g., color filter 104 may only be transparent to the wavelengths corresponding to a green color). Photosensitive areas 110A and 110B may serve to absorb incident light focused by microlens 102 and produce image signals that correspond to the amount of incident light absorbed.

Photosensitive areas 110A and 110B may each cover approximately half of the substrate area between pixel separators 112 (as an example). By only covering half of the substrate area, each photosensitive region may be provided with an asymmetric angular response (e.g., photosensitive region 110A may produce different image signals based on the angle at which incident light reaches pixel 100). The angle at which incident light reaches pixel 100 relative to a normal axis 116 may be herein referred to as the incident angle or angle of incidence.

Figure 2B:
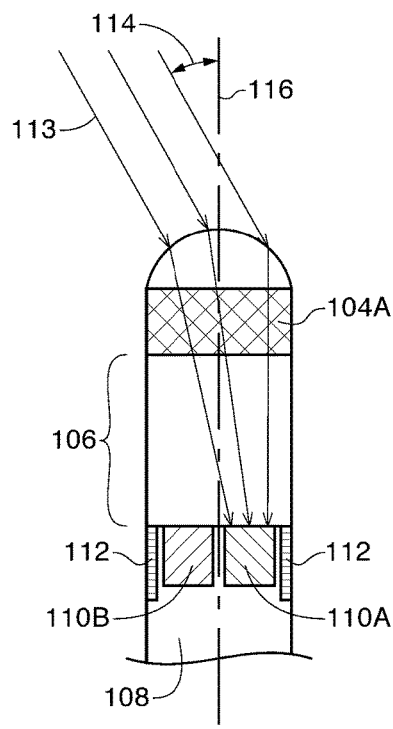
FIGS. 2B and 2C are illustrative cross-sectional views of a depth sensing pixel having photosensitive regions that may be asymmetrically sensitive to incident light at negative and positive angles of incidence in accordance with an embodiment of the present invention.

In the example of FIG. 2B, incident light 113 may originate from the left of normal axis 116 and may reach pixel 100 with an angle 114 relative to normal axis 116. Angle 114 may be a negative angle of incident light. Incident light 113 that reaches microlens 102 at a negative angle such as angle 114 may be focused towards photosensitive area 110A. In this scenario, photosensitive area 110A may produce relatively high image signals, whereas photosensitive area 110B may produce relatively low image signals (e.g., because incident light 113 is not focused towards photosensitive area 110B).

An image sensor can be formed using front side illumination imager arrangements (e.g., when circuitry such as metal interconnect circuitry is interposed between the microlens and photosensitive regions) or back side illumination imager arrangements (e.g., when photosensitive regions are interposed between the microlens and the metal interconnect circuitry). In both cases the stack of dielectric layers and metal routing layers need to be optimized to couple effectively light from the microlens to photosensitive areas, for example using light guide structures as a part of dielectric layers 106.

Figure 2C:
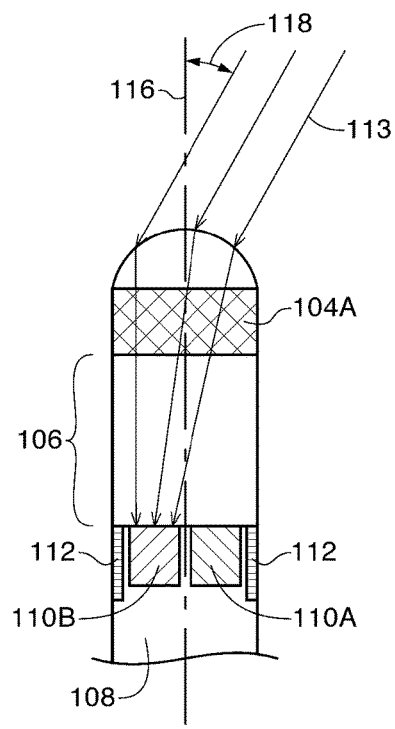

In the example of FIG. 2C, incident light 113 may originate from the right of normal axis 116 and reach pixel 100 with an angle 118 relative to normal axis 116. Angle 118 may be a positive angle of incident light. Incident light that reaches microlens 102 at a positive angle such as angle 118 may be focused towards photosensitive area 110B (e.g., the light is not focused towards, photosensitive area 110A). In this scenario, photosensitive area 110A may produce an image signal output that is relatively low, whereas photosensitive area 110B may produce an image signal output that is relatively high.

Figure 3:
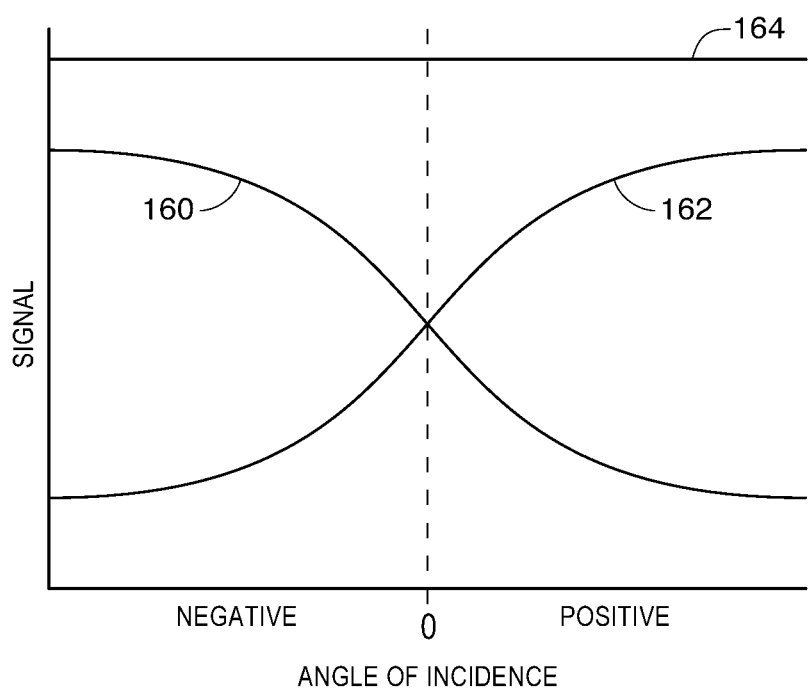
FIG. 3 is an illustrative diagram of illustrative signal outputs of photosensitive regions of a depth sensing pixel for incident light striking the depth sensing pixel at varying angles of incidence in accordance with an embodiment of the present invention.

Due to the asymmetric formation of individual photosensitive areas 110A and 110B in substrate 108, each photosensitive area may have an asymmetric angular response (e.g., photosensitive area 110A may produce different signal outputs for incident light with a given intensity based on an angle of incidence). In the diagram of FIG. 3, an example of the image signal outputs of photosensitive areas (regions) 110A and 110B of a pixel 100 in response to varying angles of incident light is shown.

Line 160 may represent the output image signal for photosensitive area 110A whereas line 162 may represent the output image signal for photosensitive area 110B. For negative angles of incidence, the output image signal for photosensitive area 110A may increase (e.g., because incident light is focused onto photosensitive area 110A) and the output image signal for photosensitive area 110B may decrease (e.g., because incident light is focused away from photosensitive area 110B). For positive angles of incidence, the output image signal for photosensitive area 110A may be relatively small and the output image signal for photosensitive area 110B may be relatively large.

Line 164 of FIG. 3 may reflect the sum of the output signals for pixel 100 (e.g., the sum of lines 160 and 162). As shown in FIG. 3, line 164 may remain relatively constant regardless of the angle of incidence (e.g., for any given angle of incidence, the total amount of light that is absorbed by the combination of photosensitive areas 110A and 110B may be substantially constant).

The size and location of photosensitive areas 110 within a pixel (e.g., as shown in FIGS. 2A, 2B, and 2C) are merely illustrative. As examples, the edges of photosensitive areas 110A and 110B may be located at the center of pixel 100 (as shown in FIG. 2A) or may be shifted slightly away from the center of pixel 100 in any direction. If desired, photosensitive areas 110 may be decreased in size to cover less than half of the pixel area.

Figure 4A:
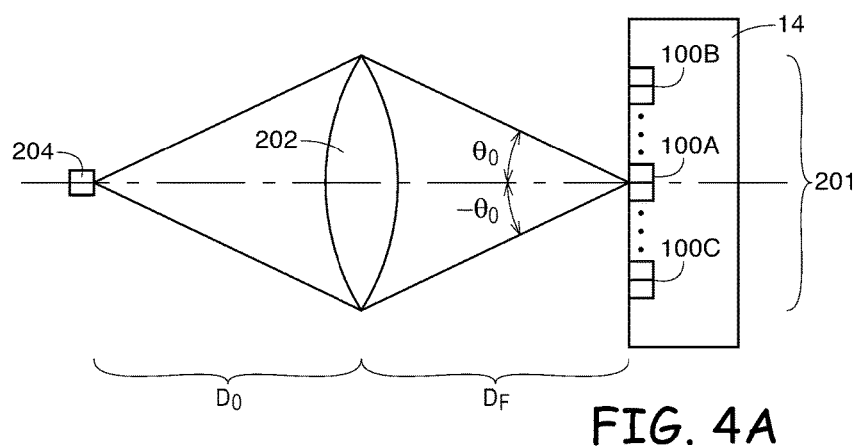
FIG. 4A is an illustrative diagram, of a depth sensing imager having a lens and of an object located at a focal distance away from the lens showing how the lens focuses light from the object onto the depth sensing imager in accordance with an embodiment of the present invention.
Figure 4B:
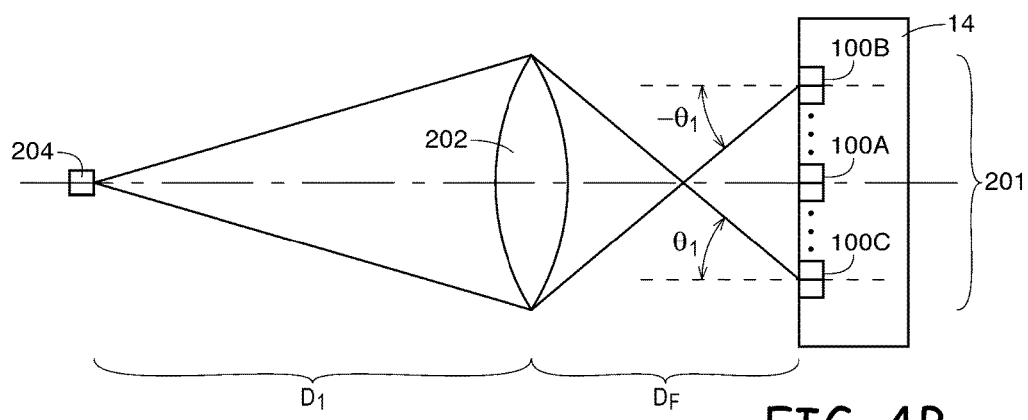
FIG. 4B is an illustrative diagram of a depth sensing imager having a lens and of an object located at more than a focal distance away from the lens showing how the lens focuses light from the object onto the depth sensing imager in accordance with an embodiment of the present invention.
Figure 4C:
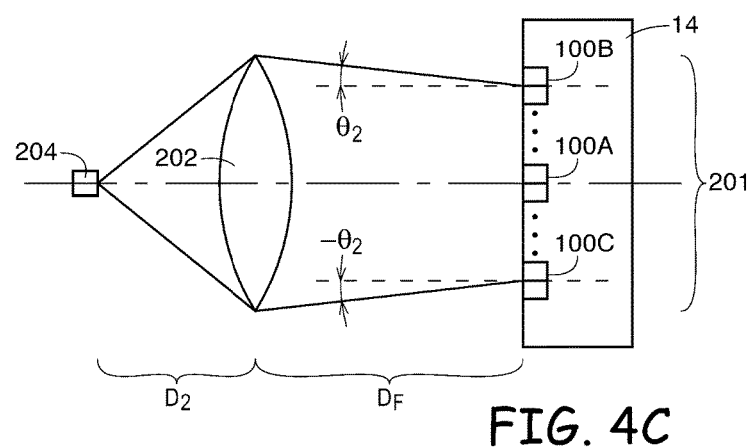
FIG. 4C is an illustrative diagram of a depth sensing imager having a lens and of an object located less than a focal distance away from the imaging lens showing how the lens focuses light from the object onto the depth sensing imager in accordance with an embodiment of the present invention.

Depth sensing pixels 100 may be used to form, imagers with depth sensing capabilities. FIGS. 4A, 4B, and 4C show illustrative image sensors 14 with depth sensing capabilities. As shown in FIGS. 4A, 4B, and 4C, image sensor 14 may contain an array of pixels 201 formed from pixels 100 (e.g., pixels 100A, 100B, 100C, etc.). Image sensor 14 may have an associated camera lens 202 that focuses light originating from a scene of interest (e.g., a scene that includes an object 204) onto the array of pixels. Camera lens 202 may be located at a distance DF from image sensor 14. Distance DF may correspond to the focal length of camera lens 202.

In the arrangement of FIG. 4A, object 204 may be located at distance D0 from camera lens 202. Distance D0 may correspond to a focused object plane of camera lens 202 (e.g., a plane located at a distance D0 from camera lens 202). The focused object plane and a plane corresponding to image sensor 14 may sometimes be referred to as conjugate planes. In this case, light from object 204 may be focused onto pixel 100A at an angle $\theta_0$ and an angle $-\theta_0$ and the image signal outputs of photosensitive regions 110A and 110B of pixel 100A may be equal (e.g., most of the light is absorbed by photosensitive region 110B for the positive angle and most of the light is absorbed by photosensitive region 110A for the negative angle).

In the arrangement of FIG. 4B, object 204 may be located at a distance D1 from camera lens 202. Distance D1 may be larger than the distance of the focused object plane (e.g., the focused object plane corresponding to distance D0) of camera lens 202. In this case, some of the light from, object 204 may be focused onto pixel 100B at a negative angle $-\theta_1$ (e.g., the light focused by the bottom half of camera lens 202) and some of the light from object 204 may be focused onto pixel 100C at a positive angle $\theta_1$ (e.g., the light focused by the top half of camera lens 202).

In the arrangement of FIG. 4C, object 204 may be located at a distance D2 from camera lens 202. Distance D2 may be smaller than the distance of the focused object plane (e.g., the focused object plane corresponding to distance D0) of camera lens 202. In this case, some of the light from object 204 may be focused by the top half of camera lens 202 onto pixel 100B at a positive angle $\theta_2$ and some of the light from object 204 may be focused by the bottom half of camera lens 202 onto pixel 100C at a negative angle $-\theta_2$.

The arrangements of FIGS. 4A, 43, and 4C may effectively partition the light focused by camera lens 202 into two halves split by a center plane at a midpoint between the top of the lens pupil and the bottom, of the lens pupil (e.g., split into a top half and a bottom half). Each photosensitive region in pixel array 201 other than photosensitive regions of the center pixel may only receive substantial light from one of the two halves of lens 202 for objects at any distance. For example, for an object at distance D1, pixel 100B only receives substantial light from the bottom half of lens 202. For an object at distance D2, pixel 100B only receives light from the top half of lens 202. The partitioning of the light focused by camera lens 202 may be referred to herein as lens partitioning or lens pupil division.

The output image signals of each pixel 100 of image sensor 14 may depend on the distance from camera lens 202 to object 204. The angle at which incident light reaches depth sensing pixels of image sensor 14 depends on the distance between lens 202 and objects in a given scene (e.g., the distance between objects such as object 204 and device 10).

Figure 5:
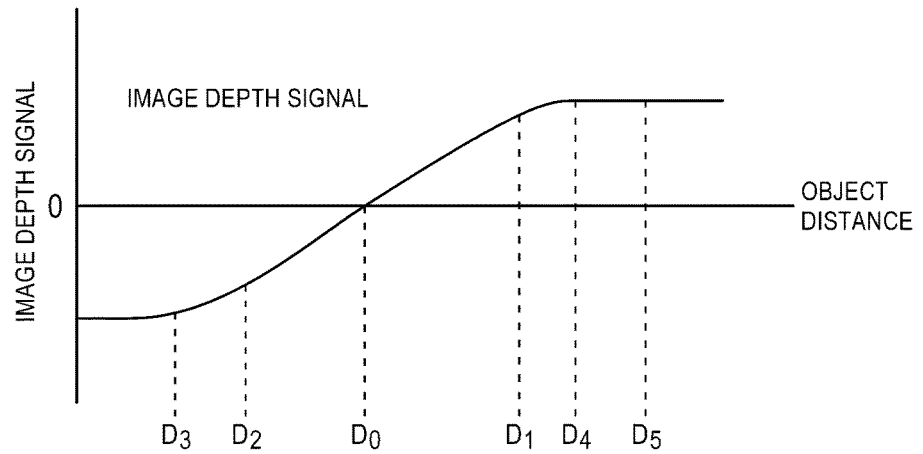
FIG. 5 is an illustrative diagram of illustrative depth signal values produced using output signals from a depth sensing pixel for an object at varying distances from the depth sensing pixel in accordance with an embodiment of the present invention.

An image depth signal may be calculated from the difference between the output image signals of the photosensitive areas of each pixel 100. The diagram of FIG. 5 shows an image depth signal that may be calculated for pixel 100B by subtracting the image signal output of photosensitive area 110B from the image signal output of photosensitive area 110A (e.g., by subtracting line 162 from line 160 of FIG. 3). As shown in FIG. 5, for an object at a distance that is less than distance D0 (e.g., the focused object distance), the image depth signal may be negative. For an object at distance that is greater than the focused object distance D0, the image depth signal may be positive.

For distances, greater than D4 and less than D3, the image depth signal may remain substantially constant. Photosensitive regions 110A and 110B may be unable to resolve incident angles with magnitudes larger than the magnitudes of angles provided by objects at distances greater than D4 or at distances less than D3). In other words, it may be difficult for a depth sensing imager to accurately measure depth information for objects at distances greater than D4 or at distances less than D3. As an example, the depth sensing imager may have difficulty distinguishing whether an object is at a distance D4 or a distance D5 (as an example). If desired, the depth sensing imager may assume that all objects that result in an image depth signal equivalent to distance D2 or D4 are at a distance of D2 or D4, respectively (e.g., the imager may identify objects located at distances such as D2 as being at distance D4 and objects located closer than distance D3 as being at distance D3).

Figure 6:
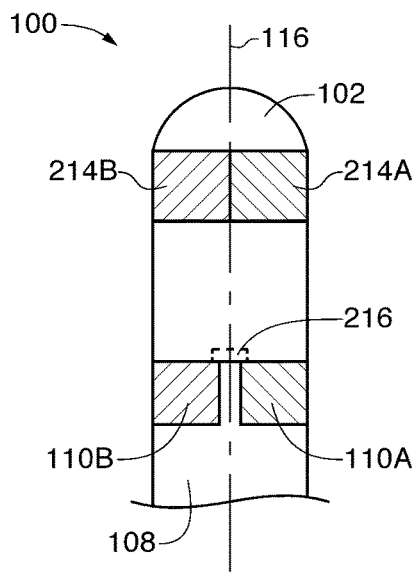
FIG. 6 is a diagram of an illustrative depth sensing pixel with multiple color filters in accordance with an embodiment of the present invention.

Depth sensing pixel 100 may be formed having the same color filter for both photosensitive regions or having multiple color filters as shown in FIG. 6. Color filter 214A may cover photosensitive region 110A, whereas color filter 214B may cover photosensitive region 110B. Color filter 214B may allow light of a first color to reach photosensitive region 110B, whereas color filter 214A may allow light of a second color to reach photosensitive region 110A. For example, color filter 214B may allow green light to pass, whereas color filter 214A may allow red light to pass. This example is merely illustrative. Depth sensing pixels may be formed with red color filters, blue color filters, green color filters, or color filters that pass other desirable wavelengths of light such as infrared and ultraviolet light wavelengths. If desired, depth sensing pixels may be formed with color filters that pass multiple wavelengths of light. For example, to increase the amount of light absorbed by a depth sensing pixel, the depth sensing pixel may be formed with a color filter that passes many wavelengths of light. As another example, the depth sensing pixel may be formed without a color filter (sometimes referred to as a clear pixel). Pixel 100 may be formed with any desired number of color filters. For example, color filters may be provided for and substantially cover respective photosensitive regions of pixel 100. Alternatively, color filters may be provided for respective groups of photosensitive regions of pixel 100.

As shown in FIG. 6, an optional opaque layer 216 may be provided that covers an intermediate region between photosensitive areas 110A and 110B. Optional opaque layer 216 may be formed from metals, dielectric materials, or any other desirable opaque material (e.g., a material that prevents light from passing through to substrate 108). Opaque layer 216 may be formed to directly contact substrate 108 or, if desired, may be formed at a distance from substrate 108. Opaque layer 216 helps to isolate photosensitive region 110A from photosensitive region 110B, which may help to improve depth sensing operations.

Figure 7A:
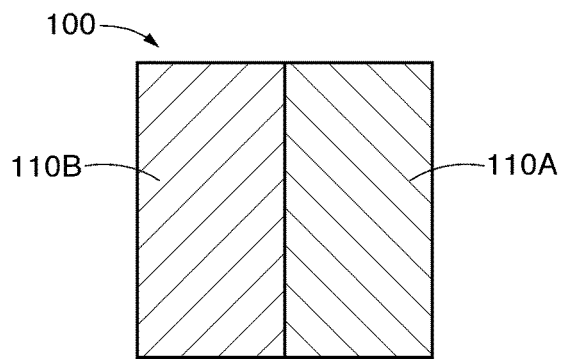
FIG. 7A is an illustrative diagram of a depth sensing pixel having horizontally arranged photosensitive regions in accordance with an embodiment of the present invention.

FIG. 7A is a simplified top-down view of photosensitive areas 110A and 110B of a pixel 100 (e.g., FIG. 7A may represent the footprint of pixel 100 within a pixel array). Areas 110A and 110B may be formed horizontally, with photosensitive area 110B on the left and photosensitive area 110A on the right. A camera lens (e.g., camera lens 202) used to focus light onto a pixel array including pixels with horizontally formed photosensitive areas may be horizontally partitioned (e.g., the resulting lens pupil division may be horizontal). In this scenario, the distance to an object may be determined from light originating from either the left side of the lens pupil or the right side of the lens pupil.

In addition to depth sensing mode of operation pixel 100 of an image sensor may be used for two-dimension image capture. In this case charges acquired in photosensitive areas 110A and 110B can be summed together using a common floating diffusion node.

Figure 7B:
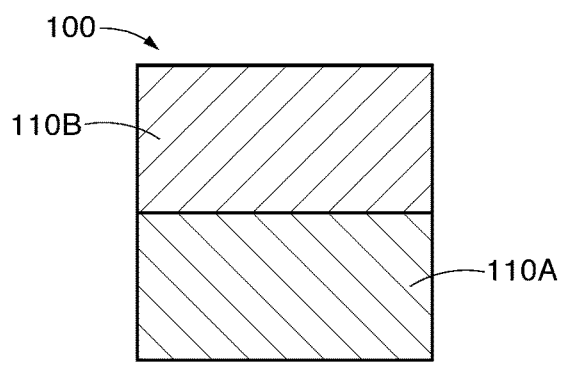
FIG. 7B is an illustrative diagram of a depth sensing pixel having vertically arranged photosensitive regions in accordance with an embodiment of the present invention.

Pixels 100 of an image sensor may be formed along any desired axis. FIG. 7B is a simplified top-down view of a pixel having photosensitive areas 110A and 110B that are formed vertically. In the arrangement of FIG. 7B, a lens 202 (not shown) used to focus light onto a pixel array formed from vertically split pixels 100 may be vertically partitioned into a top portion and a bottom portion (e.g., the resulting lens pupil division may be vertical). In this scenario, the distance to an object may be determined from light originating from either the top half of the lens pupil or the bottom half of the lens pupil.

Figure 7C:
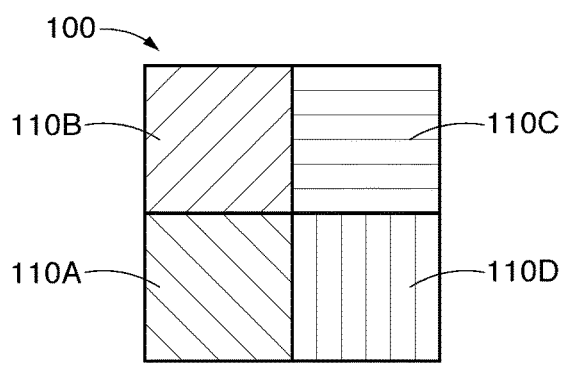
FIG. 7C is an illustrative diagram of a depth sensing pixel having multiple photosensitive regions in accordance with an embodiment of the present invention.

The examples of FIGS. 7A and 7B in which pixels 100 are formed from two photosensitive regions is merely illustrative. A pixel 100 may be formed having multiple photosensitive regions as shown in FIG. 7C. In the arrangement of FIG. 7C, pixel 100 may include photosensitive areas 110A, 110B, 110C, and 110D. In this scenario, a camera lens used to focus, light onto an array of the pixels may be both vertically and horizontally partitioned.

As an example, image signal outputs from photosensitive areas 110A and 110B may be summed to form a first combined signal output and image signal outputs from photosensitive areas 110C and 110D may be summed to form a second combined signal output. In this scenario, the first combined signal output and the second combined signal output may be used to determine image depth signals that horizontally partition the camera lens (e.g., into left and right portions). Vertical partitioning of the camera lens may be performed by summing image signals from photosensitive areas 110B and 110C to form a third combined signal output and summing image signals from photosensitive areas 110A and 110D to form a fourth combined signal output. The third and fourth combined signal outputs may be used to determine image depth signals that vertically partition the camera lens. In the example of FIG. 7C, image signals from pixel 100 may be processed to perform vertical and horizontal camera lens splitting.

Pixel 100 may be used for two-dimensional image capture. In this case signals from photosensitive areas 110A, 110B, 110C, 110D can be summed together by binning charges on the common floating diffusion node.

If desired, pixels 100 may be split into photosensitive regions along any desired axis (e.g., horizontally, vertically, diagonally, etc.). Pixel arrays may be formed having only one type of pixels 100, two types (e.g., horizontally and vertically split pixels), or more types of lens division.

Figure 8:
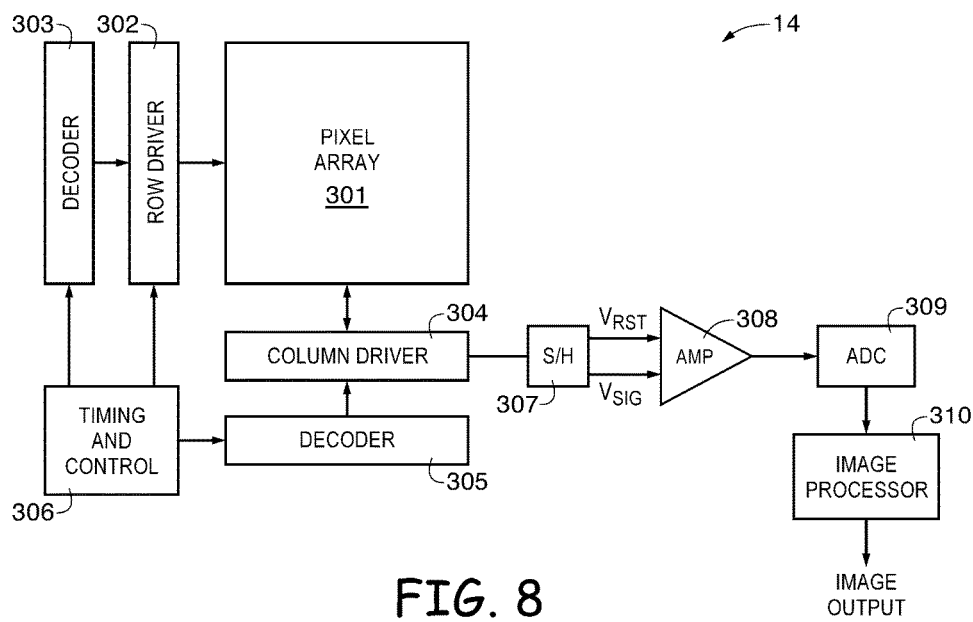
FIG. 8 is a block diagram of an imager employing depth sensing pixels in accordance with an embodiment of the present invention.

FIG. 8 illustrates a simplified block diagram of an imager 14, for example a CMOS imager, employing a pixel array 301 having depth sensing pixels. Pixel array 301 includes a plurality of pixels (e.g., depth sensing pixels and/or regular pixels) arranged in a predetermined number of columns and rows. The row lines are selectively activated by the row driver 302 in response to row address decoder 303 and the column select lines are selectively activated by the column driver 304 in response to column address decoder 305. Thus, a row and column address is provided for each pixel.

Imager 14 is operated by a timing and control circuit 306, which controls decoders 303 and 305 for selecting the appropriate row and column lines for pixel readout, and row and column driver circuitry 302, 304, which apply driving voltages to the drive transistors of the selected row and column lines. The pixel signals, which typically include a pixel reset signal Vrst and a pixel image signal Vsig for each pixel (or each photosensitive region of each pixel) are sampled by sample and hold circuitry 307 associated with the column driver 304. A differential signal Vrst-Vsig is produced for each pixel (or each photosensitive area of each pixel), which is amplified by an amplifier 308 and digitized by analog-to-digital converter 309. The analog to digital converter 309 converts the analog pixel signals to digital signals, which are fed to an image processor 310 which forms a digital image. Image processor 310 may, for example, be provided as part of image processing and data formatting circuitry 16 of FIG. 1.

Figure 9:
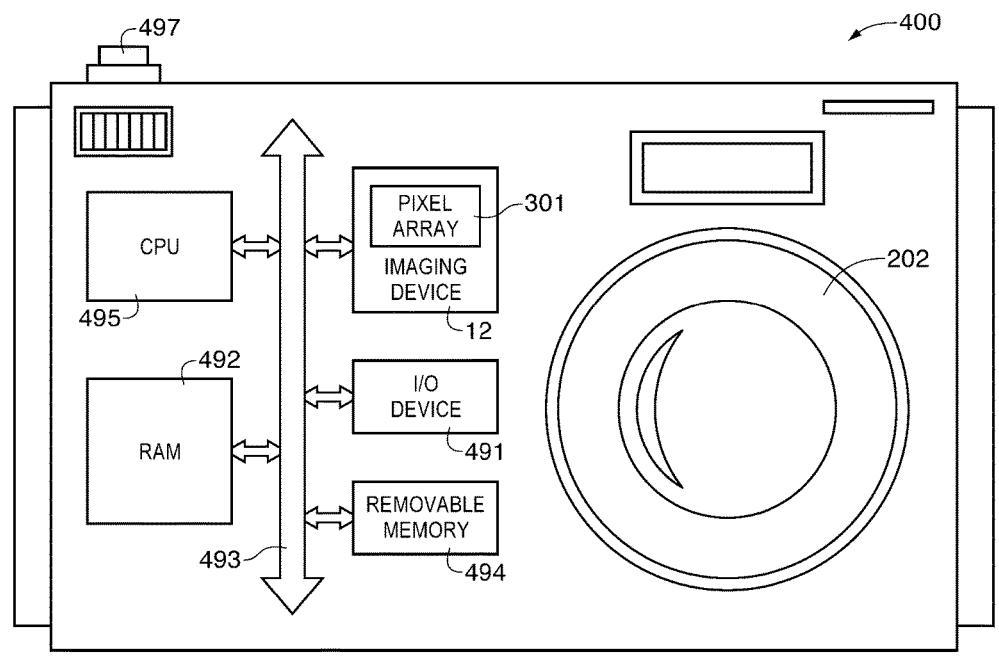
FIG. 9 is a block diagram of a processor system employing the imager of FIG. 8 in accordance with an embodiment of the present invention.

FIG. 9 is a simplified diagram of an illustrative processor system 400, such as a digital camera, which includes an imaging device 12 (e.g., the camera module of FIG. 1) employing an imager having depth sensing pixels as described above. The processor system 400 is exemplary of a system having digital circuits that could include imaging device 12. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 400, for example a digital still or video camera system, generally includes a lens 202 for focusing an image on pixel array 301 when a shutter release button 497 is pressed, central processing unit (CPU) 495, such as a microprocessor which controls camera and one or more image flow functions, which communicates with one or more input/output (I/O) devices 491 over a bus 493. Imaging device 12 also communicates with CPU 495 over bus 493. System 400 also includes random access memory (RAM) 492 and can optionally include removable memory 494, such as flash memory, which also communicates with CPU 495 over the bus 493. Imaging device 12 may be combined with the CPU, with or without memory storage on a single integrated circuit or on a different chip. Although bus 493 is illustrated as a single bus, it may be one or more busses, bridges or other communication paths used to interconnect system components of system 400.

Figure 10:
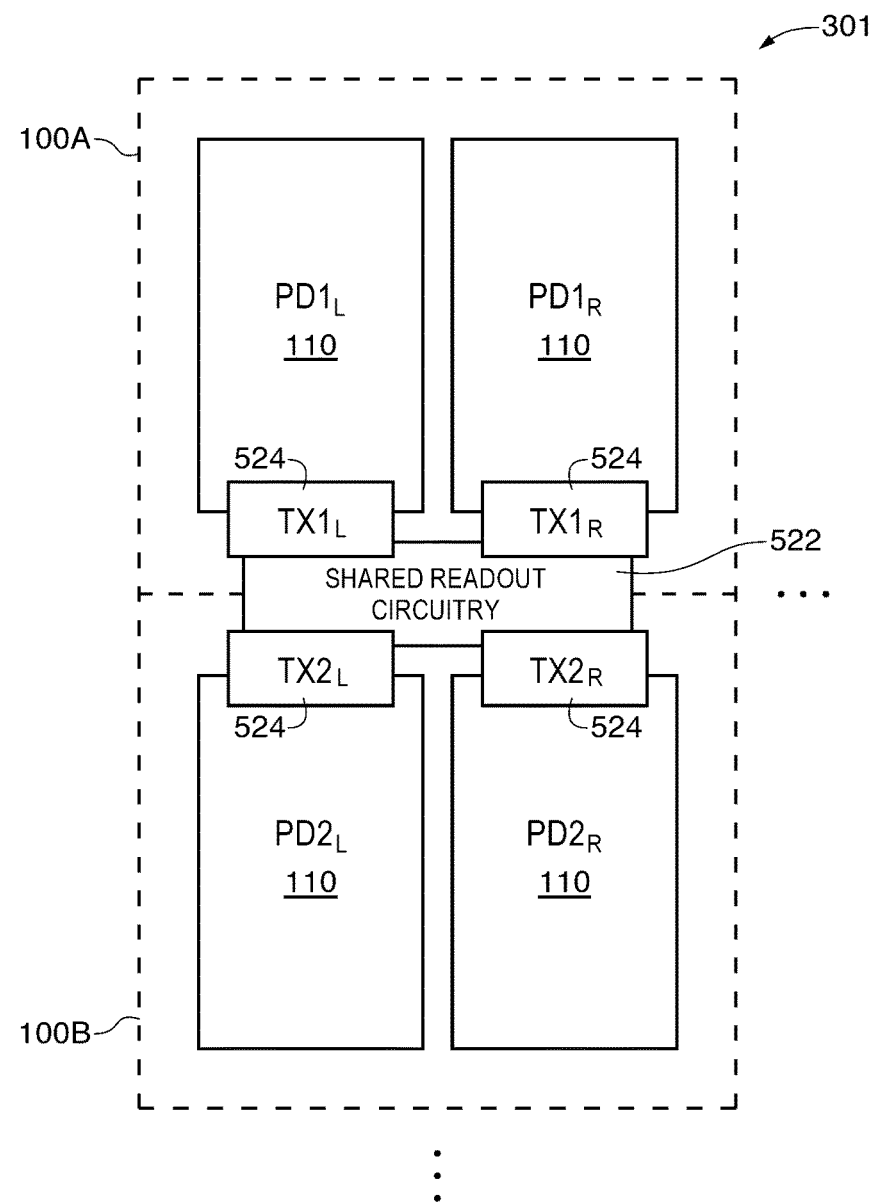
FIG. 10 is an illustrative diagram showing how multiple depth sensing pixels may share readout circuitry in accordance with an embodiment of the present invention.

Image signal outputs from photosensitive regions of one or more pixels may be combined using shared readout circuitry. FIG. 10 is a diagram of an illustrative pixel array 301 including a group of pixels 100A and 100B that share readout circuitry 522. In the example of FIG. 10, the photosensitive areas 110 of pixels 100A and 100B are formed horizontally for each pixel (e.g., as shown in FIG. 7A). However, if desired, the photosensitive areas of pixels 100A and 100B may be formed in any desired arrangement (e.g., the arrangements of FIGS. 7A, 7B, 7C, any desired combination of these arrangements, or other arrangements).

Photosensitive regions 110 may form photodiodes that are read out using shared readout circuitry 522. Photosensitive regions 110 of pixel 100A may form photodiodes $PD1_L$ and $PD1_R$, whereas photosensitive regions 100 of pixel 100B may form photodiodes $PD2_L$ and $PD2_R$. Each photodiode may be coupled to shared readout circuitry 522 via a respective transfer gate 524. In the example of FIG. 10, photodiodes $PD1_L$, $PD1_R$, $PD2_L$, and $PD2_R$ may be coupled to shared readout circuitry 522 via transfer gates $TX1_L$, $TX1_R$, $TX2_L$, and $TX2_R$, respectively.

Shared readout circuitry 522 may include a common storage region (e.g., a floating diffusion region) to which readout circuitry such as readout transistors and reset transistors are coupled. Image signals (i.e., acquired charge) from photosensitive regions 110 may be transferred to the common storage region by controlling transfer gates 524 (e.g., by activating or deactivating transfer gates 524).

An imager such as imager 14 of FIG. 8 may be configured to selectively drive transfer gates 524 so that image signals are read sequentially from photodiodes HO or in parallel. For example, row driver circuitry 302 may be configured to selectively activate transfer gates 524 to transfer image signals to shared readout circuitry 522 (e.g., image signals from only photodiode $PD1_L$ may be read by activating transfer gate $TX1_L$ while deactivating transfer gates $TX1_R$, $TX2_L$, and $TX2_R$, whereas image signals from photodiodes $PD1_L$ and $PD1_R$ may be read in parallel by activating transfer gates $TX1_L$ and $TX1_R$ while deactivating transfer gates $TX2_L$ and $TX2_R$).

Figure 11:
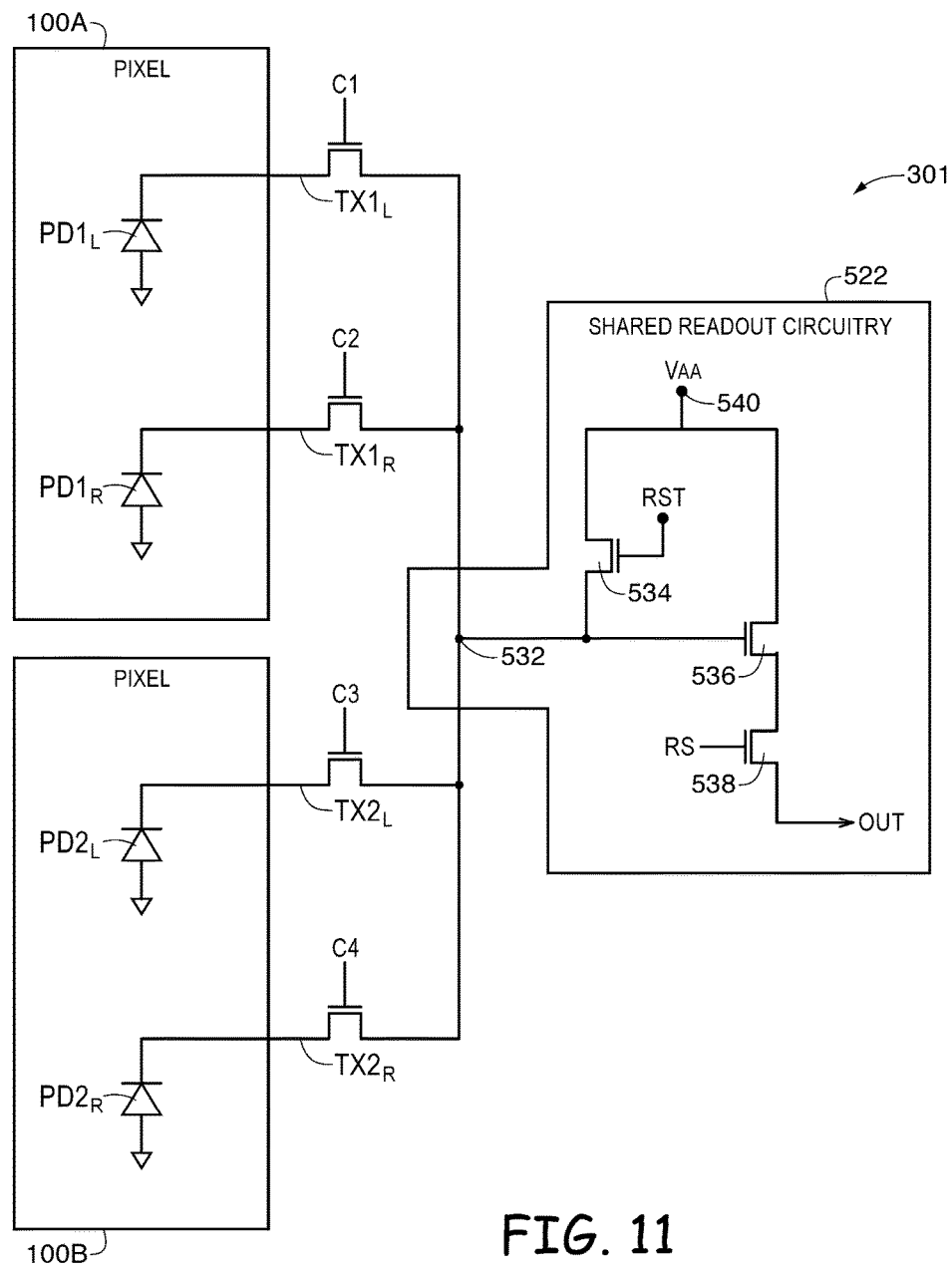
FIG. 11 is an illustrative circuit diagram showing how multiple depth sensing pixels may have shared readout circuitry in accordance with an embodiment of the present invention.

FIG. 11 is an illustrative circuit diagram of an illustrative pixel array 301 including depth sensing pixels 100A and 100B that share read readout circuitry 522 (e.g., pixel array 301 of FIG. 10). As shown in FIG. 11, depth sensing pixels 100A and 100B may include photodiodes (e.g., formed from corresponding photosensitive regions) that are each coupled to shared floating diffusion region 532 (sometimes referred to as a charge storage node or charge detection node, because charge from the photodiodes is detected and at least temporarily stored at the charge storage node).

A positive power supply voltage (e.g., voltage $V_{AA}$) may be supplied at positive power supply terminal 540. Before an image is acquired, reset control signal RST may be asserted, which enables reset transistor 534. When enabled, reset transistor 534 resets charge storage node 532. Reset control signal RST may then be de-asserted to disable reset signal RST (e.g., thereby disconnecting supply voltage $V_{AA}$ from floating diffusion region 532).

During signal readout operations, image signals from pixels 110A and 100B may be transferred to charge storage node 532 via transfer gates $TX1_L$, $TX1_R$, $TX2_L$, and $TX2_R$ (e.g., as described in connection with FIG. 10). Transfer gates $TX1_L$, $TX1_R$, $TX2_L$, and $TX2_R$ may be controlled via respective control signals C1, C2, C3, and C4 that are provided to gate terminals of the transfer gates. Row select signal RS may be provided using row driver circuitry such as row driver circuit 302 of FIG. 8. The row select signal may be asserted to transfer the stored image signals from charge storage node 532 to sample and hold circuitry such as circuitry 307 of FIG. 8.

The example of FIG. 11 in which two adjacent pixels are grouped to share readout circuitry 522 is merely illustrative. If desired, any number of adjacent pixels may be grouped to share readout circuitry. For example, four pixels (or more) may be grouped to share readout circuitry. If desired, each pixel may be provided with respective readout circuitry 522. If desired, each photosensitive region may be provided with respective readout circuitry 522 (e.g., readout circuitry 522 may be provided for each photosensitive region 110).

Two-dimensional image information may be obtained from a pixel 100 by summing the output signals from photosensitive regions of a pixel. For example, image processing and data formatting circuitry 16 of FIG. 1 or image processor 310 of FIG. 8 may be used to combine the output signals from the photosensitive areas of each pixel 100 in a pixel array 14 to obtain a regular two-dimensional color image. As another example, charge summing (e.g., described in connection with FIG. 11) between the photosensitive areas of each pixel 100 may be used to combine the light collected by each photosensitive area to form a two-dimensional image.

Figure 12:
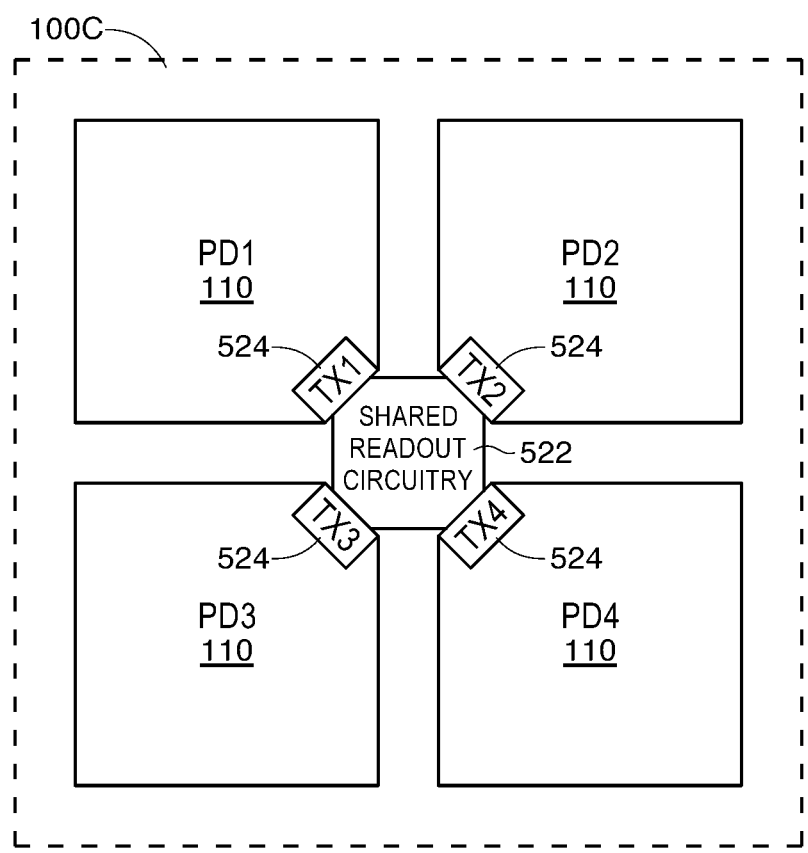
FIG. 12 is a diagram of an illustrative depth sensing pixel having four photosensitive regions that form respective photodiodes in accordance with an embodiment of the present invention.

FIG. 12 is a diagram of an illustrative depth sensing pixel 100C having four photosensitive regions 110 that form respective photodiodes PD1, PD2, PD3, and PD4. The photodiodes of depth sensing pixel 100C may share readout circuitry 522 (e.g., to a shared floating diffusion region of circuitry 522). Each photodiode may be coupled to snared readout circuitry 522 via a respective transfer gate 524 (e.g., photodiode PD1 may be coupled to readout circuitry 522 via transfer gate TX1, etc.).

During depth sensing operations, each photodiode of depth sensing pixel 100C may be read separately by activating the corresponding transfer gate (e.g., while the remaining transfer gates are de-activated). The image signals may be combined to perform horizontal lens splitting, vertical lens splitting, and diagonal lens splitting. If desired, groups of photodiodes may be read together by selectively activating transfer gates. For example, photodiodes PD1 and PD2 may be read together, photodiodes PD1 and PD3 may be read together, etc. During two-dimensional imaging operations, all transfer gates may be activated to transfer charge from photodiodes PD1, PD2, PD3, and PD4 simultaneously.

Figure 13:
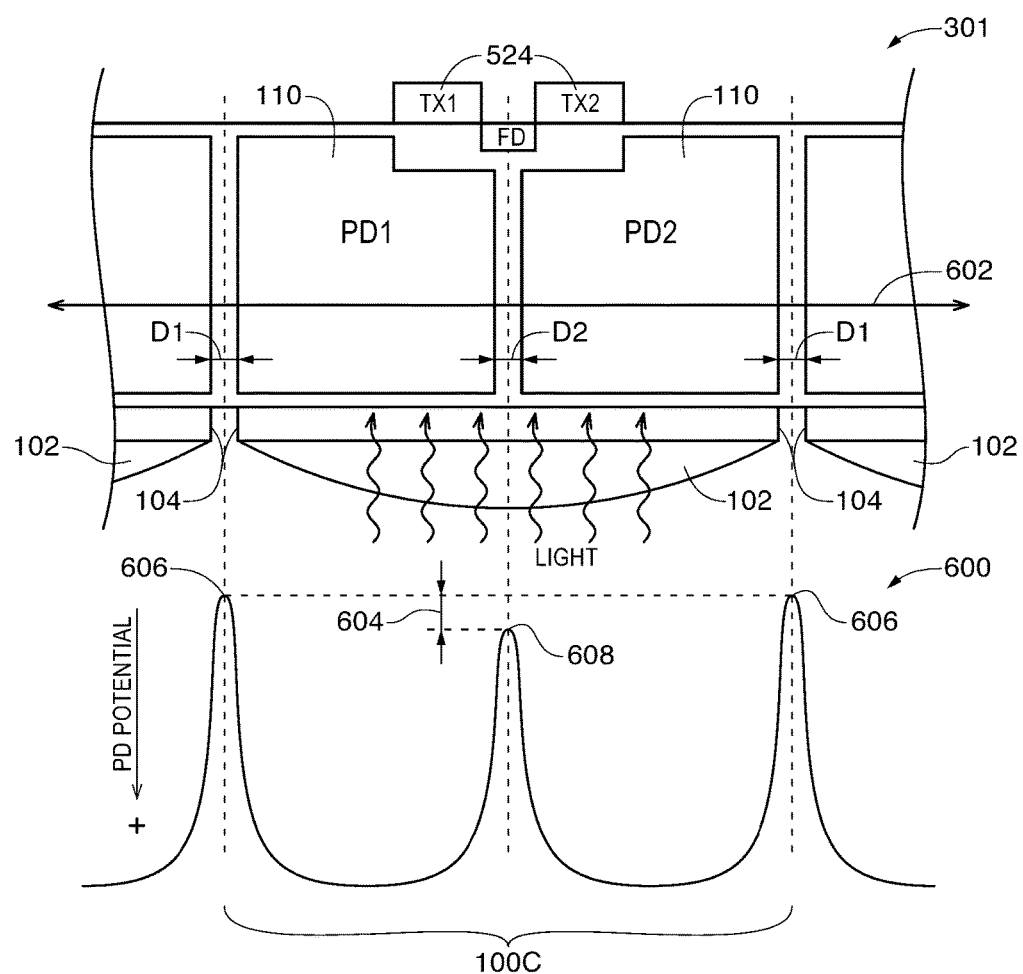
FIG. 13 is an illustrative cross-sectional side view of a pixel array with a corresponding graph of photo-diode potential across an axis of the pixel array in accordance with an embodiment of the present invention.

FIG. 13 is an illustrative cross-sectional side view of pixel array 301 including pixel 100C (FIG. 12) with a corresponding graph 600 of photo-diode potential across axis 602. Axis 602 may sometimes be referred to as a potential cutline. In the example of FIG. 13, pixel 100C may be implemented as a back-side illuminated pixel in which photosensitive regions (e.g., photodiodes) are interposed between light-receiving surfaces (e.g., microlens 102 and color filters 104) circuitry such as a transfer gates 524, metal interconnects, shared readout circuitry, etc.

As shown by graph 600, the photodiode potential across axis 602 may include barriers 608 and 606 (e.g., because photodiode potential at barriers 608 and 606 is lower than at other locations along axis 602 of pixel array 301). Barriers 608 and 606 may be formed partially by physical separation between photodiodes of pixel 100C and between neighboring pixels. For example, barrier 608 may be formed via physical separation between photodiodes PD1 and PD2. Barriers 606 may be formed partially by differing pixel attributes. For example, pixel 100C may include color-filters 104 that pass a first color (e.g., green), whereas, neighboring pixels may include color filters 104 that pass other colors (e.g., blue, red). In this scenario, the physical distance D1 separating pixel 100C and neighboring pixels may combine with the different color filter attributes to provide increased inter-pixel isolation relative to intra-pixel isolation. In other words, inter-pixel barrier 606 that isolates neighboring pixels may be greater than intra-pixel barrier 608 that isolates neighboring photodiodes within a pixel. By providing barriers 606 and 608, electrical cross-talk between pixels and between photodiodes may be reduced, which helps to improve captured image quality. In general, it may be desirable to have increased isolation between neighboring pixels (inter-pixel isolation).

It may be desirable to have reduced intra-pixel isolation relative to inter-pixel isolation to balance sensitivity loss with depth sensing image quality and two-dimensional image quality as shown by barrier difference 604 between barriers 608 and 606. For example, charge summing between photodiodes PD1 and PD2 may be performed to obtain two-dimensional images. In this scenario, it may be desirable to have a reduced barrier 608 to help maximize the total amount of combined light absorbed by photodiodes PD1 and PD2.

Various embodiments have been described illustrating imagers with depth sensing capabilities.

An imager may include depth sensing pixels that receive incident light and convert the received light into electrical signals. The imager may have an associated imaging lens that focuses incident light onto the imager. Each of the depth sensing pixels may include a microlens that focuses incident light from the imaging lens through a color filter onto a substrate region. Each depth sensing pixel may include first and second photosensitive regions in the substrate region that receive incident light from the microlens. The first and second photosensitive regions may provide different and asymmetrical angular responses to incident light. The angular response of the first photosensitive region may be substantially inverted from the angular response of the second photosensitive region.

The first and second photosensitive regions of a given depth sensing pixel may effectively divide the corresponding imaging lens pupil into separate portions. The first photosensitive region may receive incident light from a first portion of the corresponding imaging lens pupil. The second photosensitive region may receive incident light from a second portion of the corresponding imaging lens pupil. The photosensitive regions may be configured to divide the imaging lens pupil along a horizontal axis, vertical axis, or any desired axis.

Depth information for each depth sensing pixel may be determined based on the difference between output signals of the first and second photosensitive regions of that depth sensing pixel. Color information for each depth sensing pixel may be determined from a summation of output signals of the first and second photosensitive regions.

The foregoing is merely illustrative of the principles of this invention and various modifications can be made by those skilled in the art without departing from the scope and spirit of the invention.

What is claimed is:

1. A depth sensing imaging pixel comprising:
    a first photosensitive region having a first asymmetrical angular response to incident light, wherein the first photosensitive region produces a first image signal;
    a second photosensitive region having a second asymmetrical angular response to incident light that is different than the first asymmetrical angular response, wherein the second photosensitive region produces a second image signal;
    a third photosensitive region having a third asymmetrical angular response to incident light that is different than the first and second asymmetrical angular responses, wherein the third photosensitive region produces a third image signal;
    a fourth photosensitive region having a fourth asymmetrical angular response to incident light that is different than the first, second, and third asymmetrical angular responses, wherein the fourth photosensitive region produces a fourth image signal, wherein the first and second photosensitive regions are positioned in a first row, wherein the third and fourth photosensitive regions are positioned in a second row that is different from the first row, wherein the first and third photosensitive regions are positioned in a first column, and wherein the second and fourth photosensitive regions are positioned in a second column that is different from the first column;
    a microlens that covers the first, second, third, and fourth photosensitive regions, wherein the microlens does not cover any additional photosensitive regions;
    a floating diffusion node;
    first, second, third, and fourth transfer gates, wherein the first transfer gate is coupled between the floating diffusion node and the first photosensitive region, wherein the second transfer gate is coupled between the floating diffusion node and the second photosensitive region, wherein the third transfer gate is coupled between the floating diffusion node and the third photosensitive region, wherein the fourth transfer gate is coupled between the floating diffusion node and the fourth photosensitive region, wherein the first transfer gate transfers charge from the first photosensitive region to the floating diffusion node, wherein the second transfer gate transfers charge from the second photosensitive region to the floating diffusion node, wherein the third transfer gate transfers charge from the third photosensitive region to the floating diffusion node, wherein the fourth transfer gate transfers charge from the fourth photosensitive region to the floating diffusion node; and
    readout circuitry configured to simultaneously activate the first and third transfer gates without activating the second and fourth transfer gates.

2. The depth sensing imaging pixel defined in claim 1 further comprising:
    a substrate, wherein the first and second photosensitive regions are formed in the substrate.

3. The depth sensing imaging pixel defined in claim 2 wherein the first and second photosensitive regions are separated by a portion of the substrate.

4. The depth sensing imaging pixel defined in claim 2 further comprising:
    an opaque layer covering the portion of the substrate that separates the first and second photosensitive regions.

5. The depth sensing imaging pixel defined in claim 2 wherein the first photosensitive region is adjacent to the second photosensitive region.

6. The depth sensing imaging pixel defined in claim 2 further comprising a color filter layer that covers the first and second photosensitive regions.

7. The depth sensing imaging pixel defined in claim 6 wherein the color filter layer comprises:
    a first color filter portion that covers the first photosensitive region, wherein the first color filter portion passes incident light of a first color; and
    a second color filter portion that covers the second photosensitive region, wherein the second color filter portion passes incident light of a second color that is different than the first color.

8. The depth sensing imaging pixel defined in claim 6, wherein the microlens covers the color filter layer.

9. An imager comprising:
    a plurality of imaging pixels, wherein each imaging pixel comprises first, second, third, and fourth photosensitive regions having different and asymmetrical angular responses to incident light, wherein the first and second photosensitive regions are positioned in a first row, wherein the third and fourth photosensitive regions are positioned in a second row that is different from the first row, wherein the first and third photosensitive regions are positioned in a first column, wherein the second and fourth photosensitive regions are positioned in a second column that is different from the first column, and wherein each imaging pixel includes a respective microlens that covers only the first, second, third, and fourth photosensitive regions;

a charge detection node coupled to a subset of the plurality of imaging pixels;

a plurality of transfer gates coupled to the charge detection node, wherein each photosensitive region of the subset of the imaging pixels is coupled to a respective transfer gate of the plurality of transfer gates, and wherein each of the transfer gates is configured to transfer charge signals from a respective one of the photosensitive regions in the subset of the imaging pixels to the charge detection node; and a readout circuit coupled to the charge detection node, wherein the readout circuit is configured to simultaneously transfer charge signals from the first and second photosensitive regions to the charge detection node without transferring charge signals from the third and fourth photosensitive regions to the charge detection node.

10. The imager defined in claim 9 wherein each imaging pixel further comprises:

a color filter layer that covers the first, second, third, and fourth photosensitive regions of each imaging pixel.

11. The imager defined in claim 9 wherein the charge detection node comprises a floating diffusion region.

12. The depth sensing imaging pixel defined in claim 1, wherein the microlens is not a lenticular lens.

13. The depth sensing imaging pixel defined in claim 1 further comprising:

a color filter layer that covers the first, second, third, and fourth photosensitive regions, wherein the color filter layer passes incident light of a first color to the first, second, third, and fourth photosensitive regions.

14. The depth sensing imaging pixel defined in claim 1, wherein the first photosensitive region comprises a first photodiode, wherein the second photosensitive region comprises a second photodiode, wherein the third photosensitive region comprises a third photodiode, wherein the fourth photosensitive region comprises a fourth photodiode, and wherein the first, second, third, and fourth photodiodes are completely covered by the microlens.

15. An imaging sensor comprising:

a first photosensitive region with a first asymmetric response to incident light;

a second photosensitive region with a second asymmetric response to incident light;

a third photosensitive region with a third asymmetric response to incident light;

a fourth photosensitive region with a fourth asymmetric response to incident light;

a microlens that covers the first, second, third, and fourth photosensitive regions, wherein the microlens does not cover any additional photosensitive regions; and a color filter layer that covers the first, second, third, and fourth photosensitive regions, wherein the color filter layer passes incident light of the same color to the first, second, third, and fourth photosensitive regions.

16. The imaging sensor defined in claim 15, further comprising:

readout circuitry, wherein the first, second, third, and fourth photosensitive regions are each coupled to the readout circuitry.

17. The imaging sensor defined in claim 16, wherein the readout circuitry comprises a floating diffusion region, and wherein the first, second, third, and fourth photosensitive regions are each coupled to the floating diffusion region via a respective transfer gate.

18. The imaging sensor defined in claim 15, further comprising:

a floating diffusion region;

a first transfer gate that is coupled between the floating diffusion region and the first photosensitive area;

a second transfer gate that is coupled between the floating diffusion region and the second photosensitive area;

a third transfer gate that is coupled between the floating diffusion region and the third photosensitive area; and a fourth transfer gate that is coupled between the floating diffusion region and the fourth photosensitive area.

19. The imaging sensor defined in claim 18, further comprising readout circuitry, wherein the readout circuitry is configured to simultaneously assert the first and second transfer gates so that charge from the first and second photosensitive areas is summed in the floating diffusion region.

20. The imaging sensor defined in claim 15, wherein the first and second photosensitive areas are positioned in a first row, wherein the third and fourth photosensitive areas are positioned in a second row that is different from the first row, wherein the first and third photosensitive areas are positioned in a first column, and wherein the second and fourth photosensitive areas are positioned in a second column that is different from the first column.

21. The imaging sensor defined in claim 15, wherein the color filter layer passes incident light of only the same color to the first, second, third, and fourth photosensitive regions.

* * * * *